Figure 1:
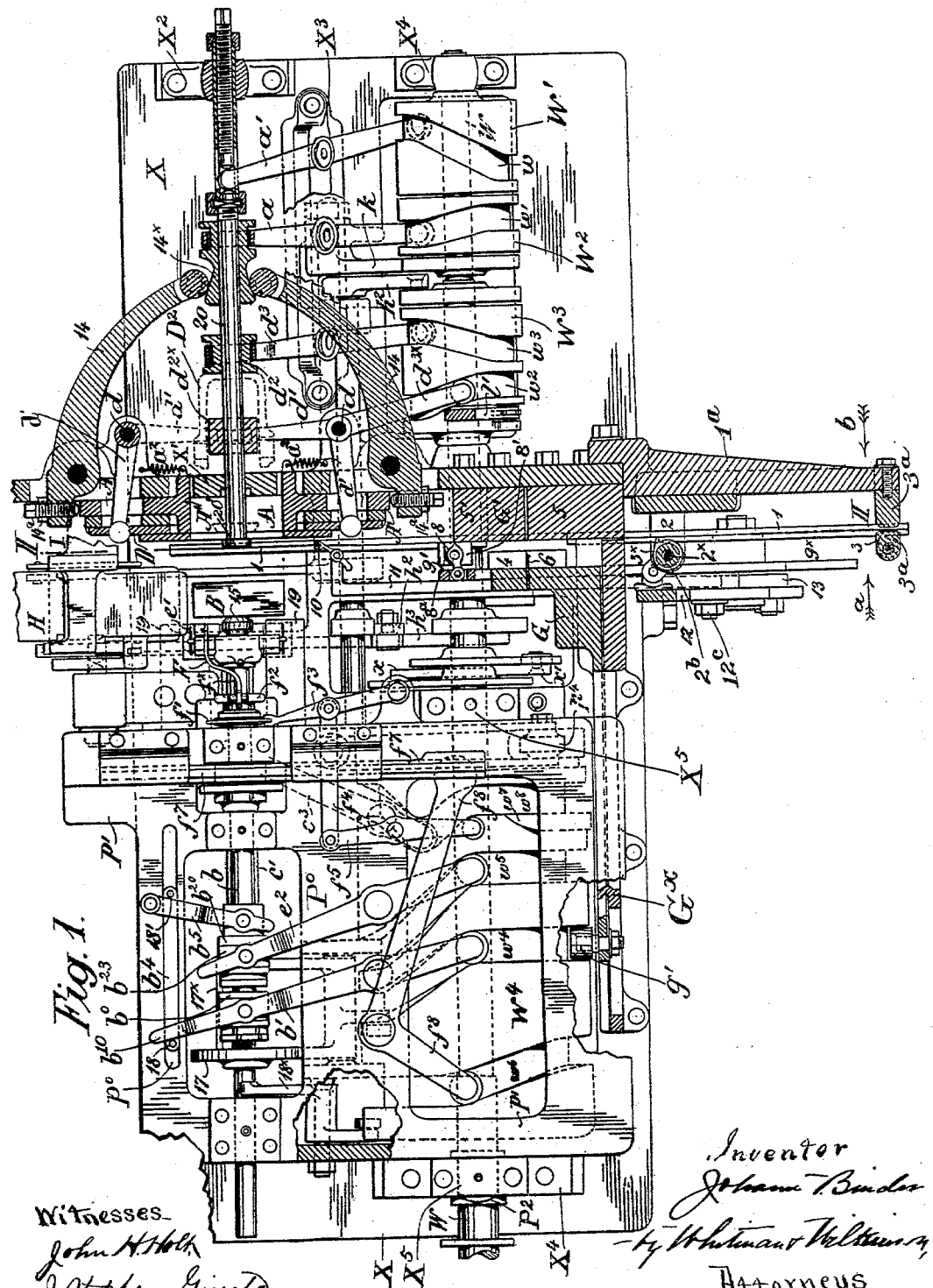

(No Model.) 9 Sheets—Sheet 1.

J. BINDER.
MACHINE FOR MANUFACTURING PASTEBOARD BOXES.

No. 597,940. Patented Jan. 25, 1898.

Witnesses
John H. Holt
J. Stephen Giusta

Inventor
Johann Binder
by Whitman & Wilkinson
Attorneys.

(No Model.)  9 Sheets—Sheet 2.

J. BINDER.
MACHINE FOR MANUFACTURING PASTEBOARD BOXES.

No. 597,940. Patented Jan. 25, 1898.

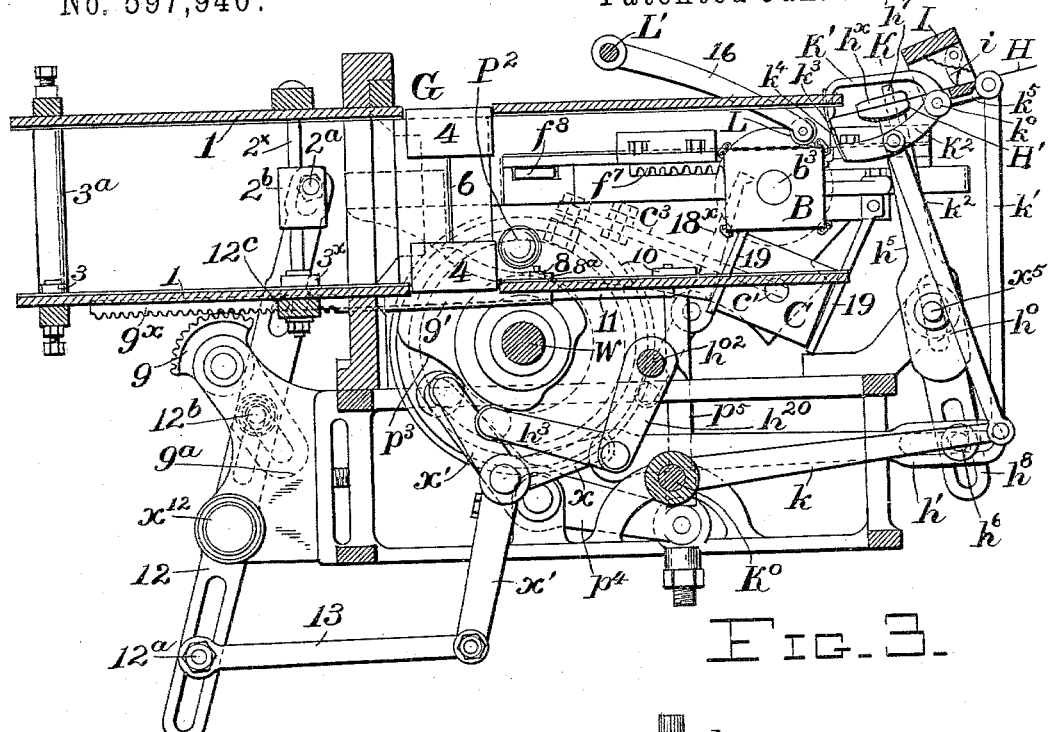

(No Model.) 9 Sheets—Sheet 4.
J. BINDER.
MACHINE FOR MANUFACTURING PASTEBOARD BOXES.
No. 597,940. Patented Jan. 25, 1898.

Witnesses
John H. Holk
J. Stephen Ginsta

Inventor
Johann Binder
by Whitman & Wilkinson,
Attorneys (No Model.) 9 Sheets—Sheet 5.
J. BINDER.
MACHINE FOR MANUFACTURING PASTEBOARD BOXES.
No. 597,940. Patented Jan. 25, 1898.
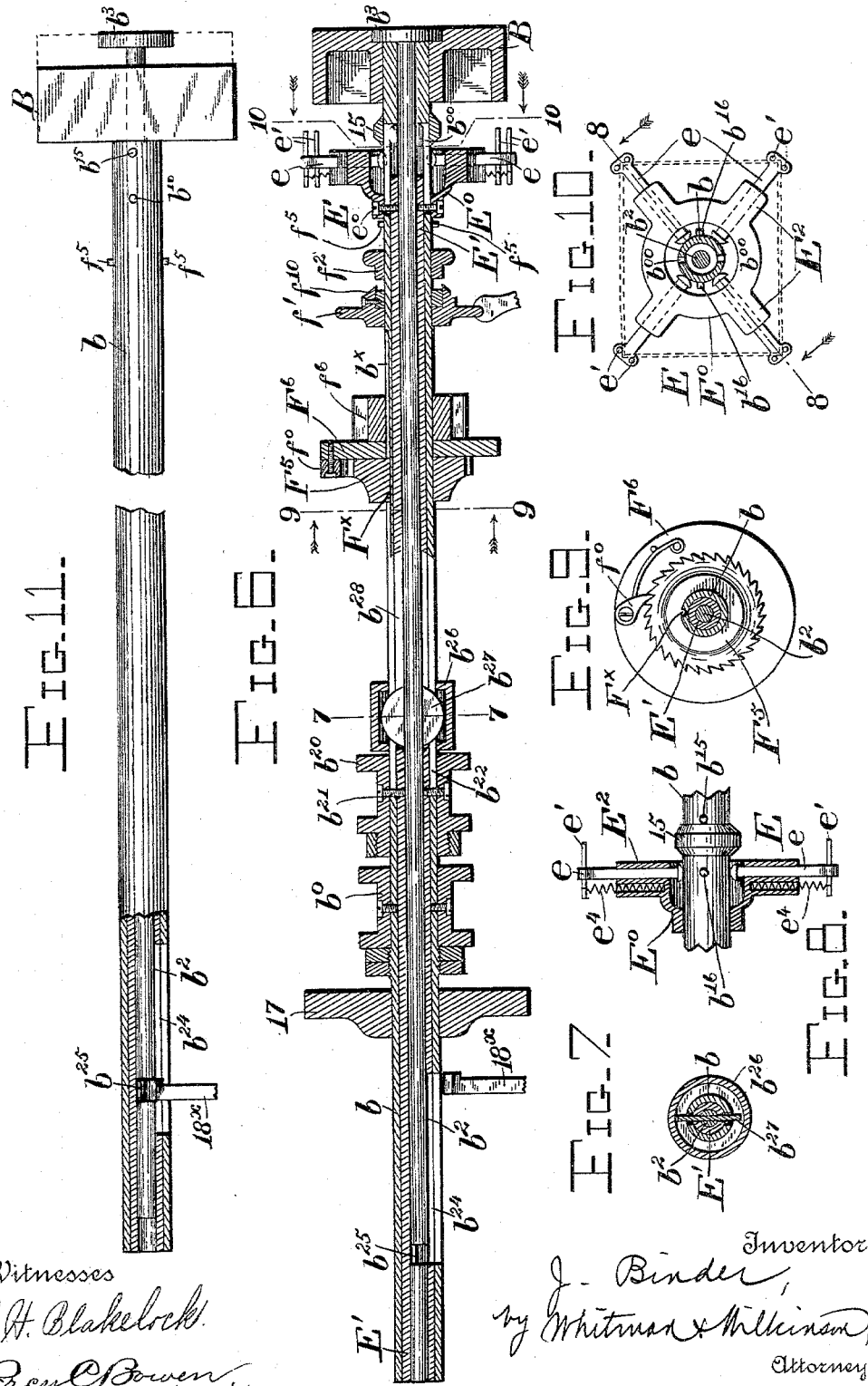
Witnesses
D. H. Blakelock.
Percy C. Bowen.
Inventor
J. Binder,
by Whitman & Wilkinson,
Attorneys.

(No Model.) 9 Sheets—Sheet 6.
J. BINDER.
MACHINE FOR MANUFACTURING PASTEBOARD BOXES.
No. 597,940. Patented Jan. 25, 1898.
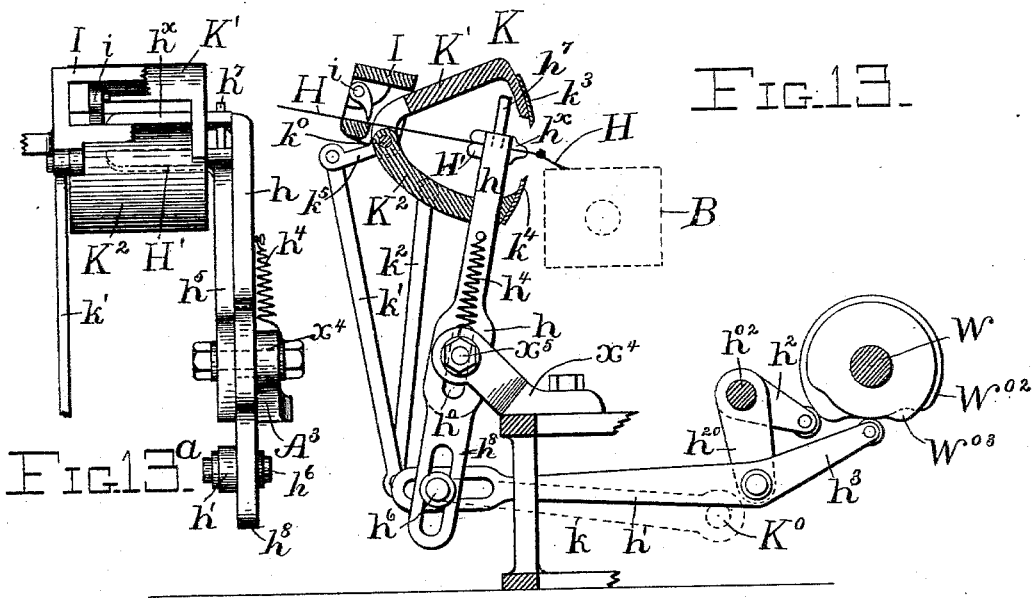
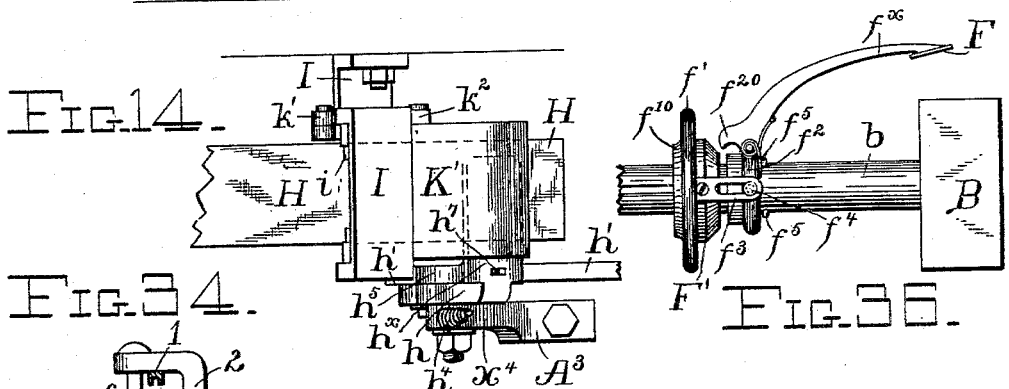
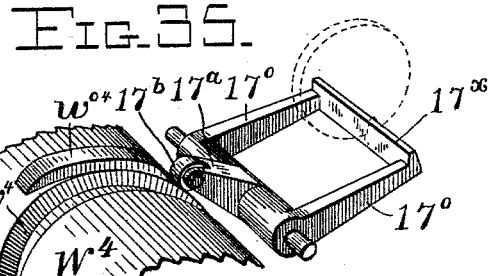
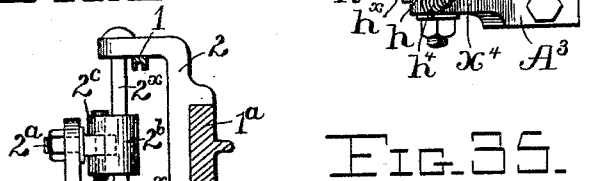
Witnesses
Percy C. Bowen
D. H. Blakelock
Inventor
J. Binder
by Wilkinson & Fisher
Attorneys (No Model.) 9 Sheets—Sheet 7.
J. BINDER.
MACHINE FOR MANUFACTURING PASTEBOARD BOXES.
No. 597,940. Patented Jan. 25, 1898.
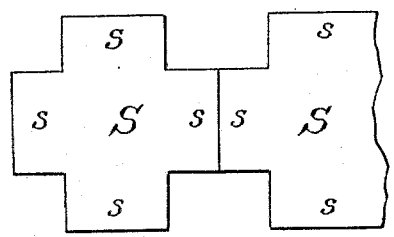
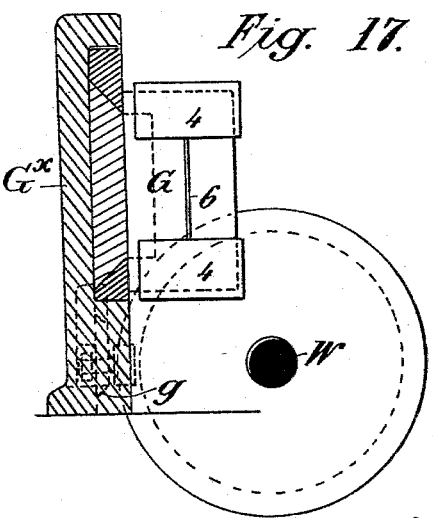
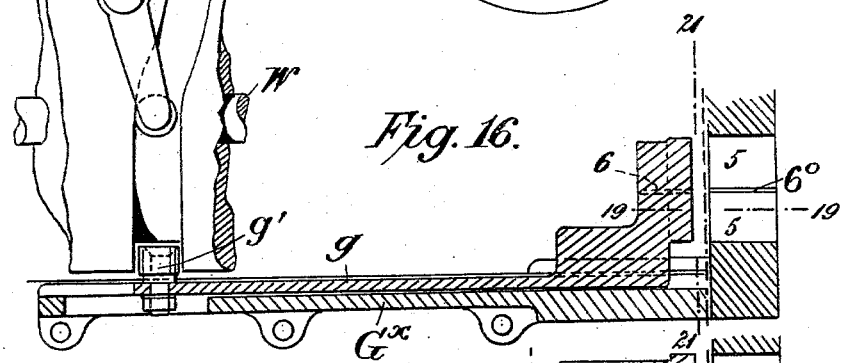
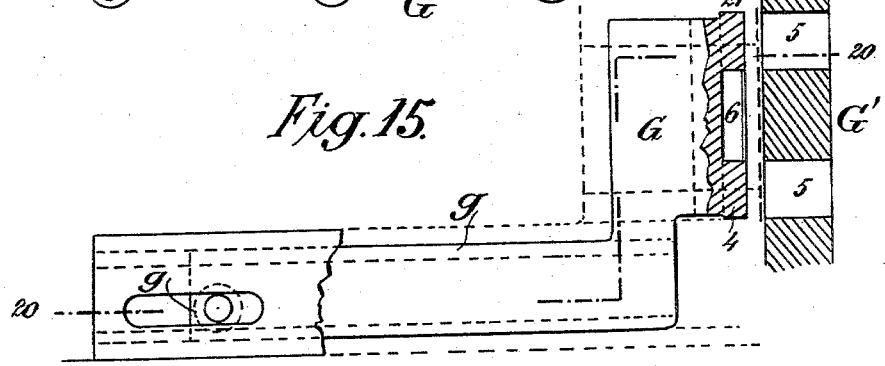
Witnesses
John H. Holt
J. Stephen Ginster
Inventor
Johann Binder
by Whitman & Wilkinson
Attorneys (No Model.) 9 Sheets—Sheet 8.
J. BINDER.
MACHINE FOR MANUFACTURING PASTEBOARD BOXES.
No. 597,940. Patented Jan. 25, 1898.
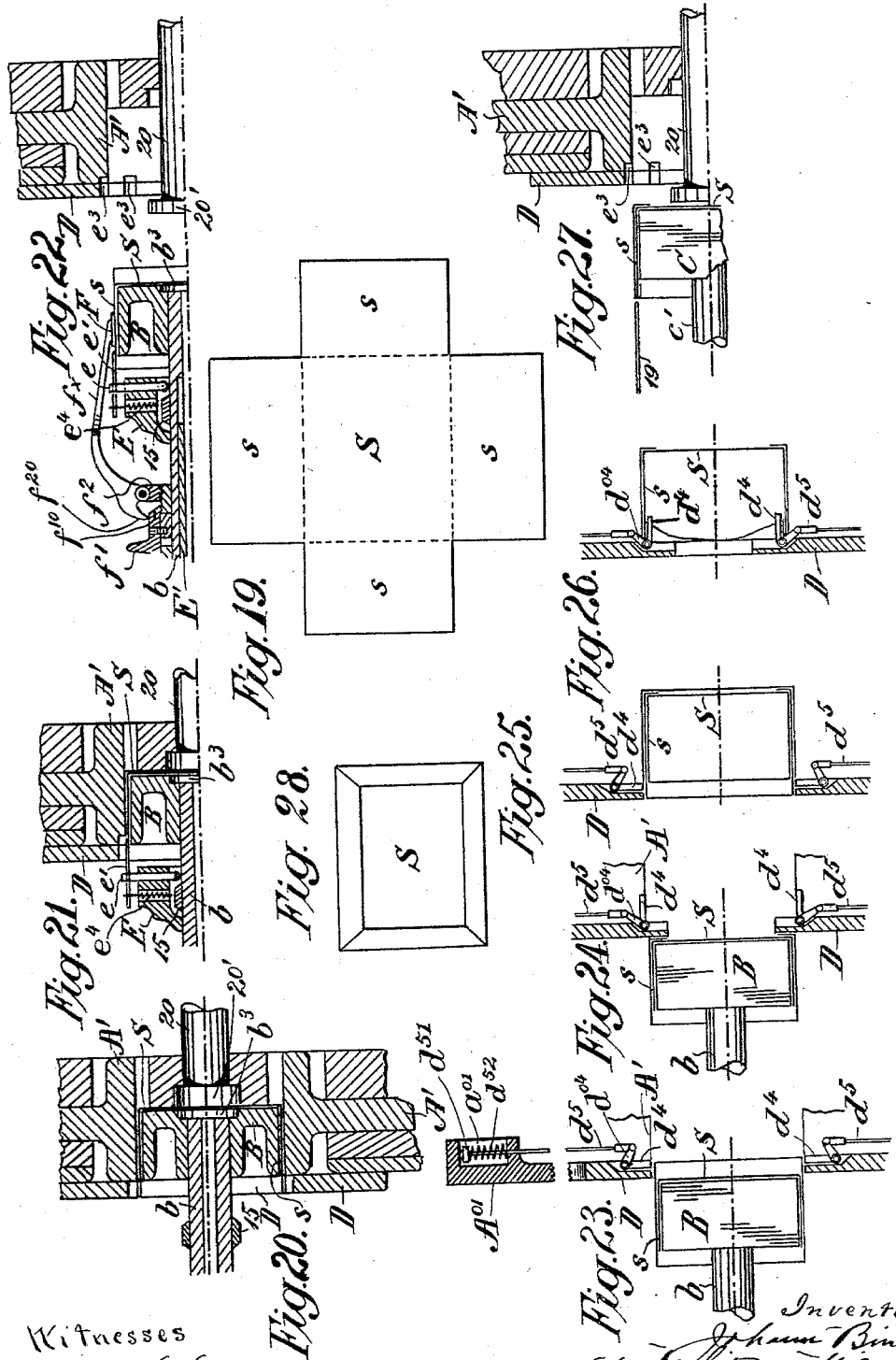

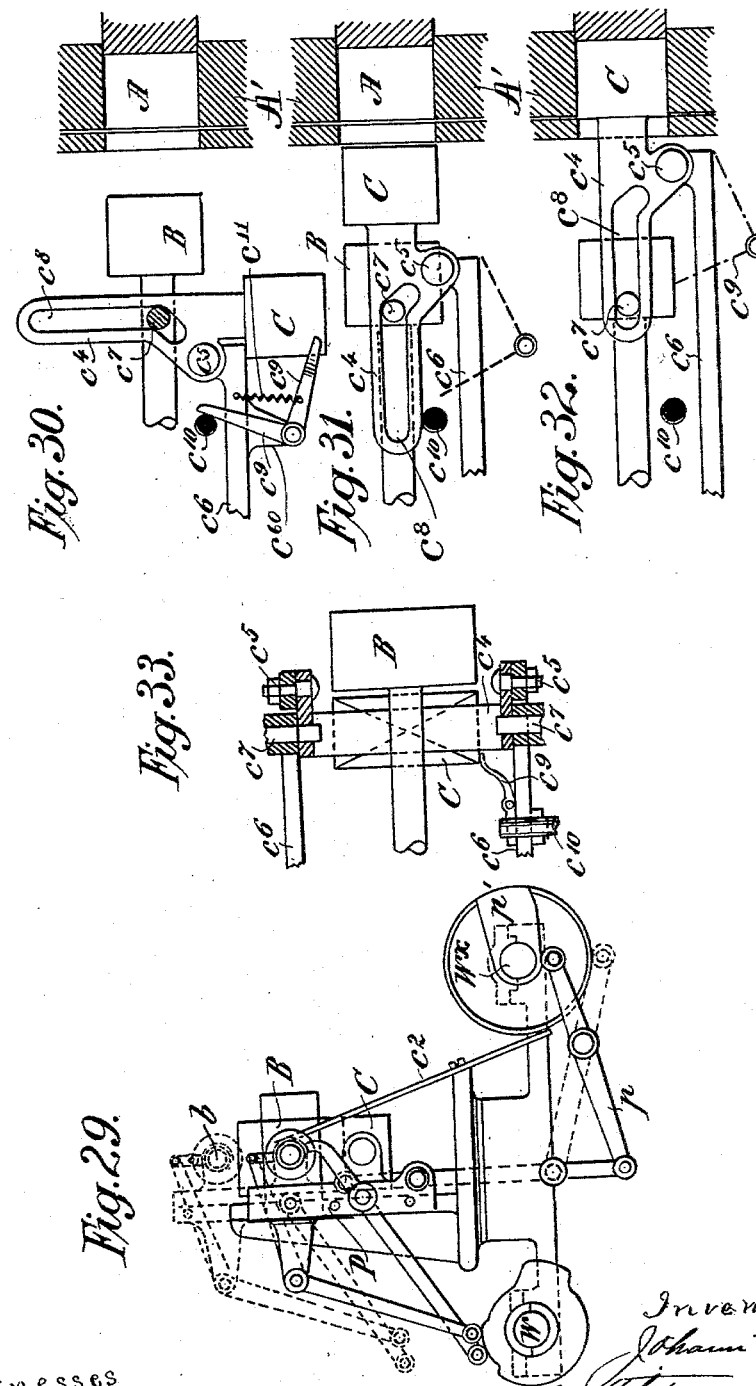

UNITED STATES PATENT OFFICE.

JOHANN BINDER, OF NEUNKIRCHEN, AUSTRIA-HUNGARY, ASSIGNOR TO HIRSCHWANGER HOLZSCHLEIFEREI UND HOLZSTOFFWAAREN FABRIK SCHOELLER & COMPANY, OF HIRSCHWANG, AUSTRIA-HUNGARY.

MACHINE FOR MANUFACTURING PASTEBOARD BOXES.

SPECIFICATION forming part of Letters Patent No. 597,940, dated January 25, 1898.

Application filed March 17, 1897. Serial No. 627,979. (No model.) Patented in Hungary March 5, 1896, No. 6,490; in France March 5, 1896, No. 254,531; in England March 5, 1896, No. 4,987; in Switzerland March 5, 1896, No. 11,935; in Belgium March 6, 1896, No. 120,188; in Turkey March 21, 1896, No. 492; in Norway March 23, 1896, No. 5,013, and in Austria November 11, 1896, No. 46/4,533.

*To all whom it may concern:*

Be it known that I, JOHANN BINDER, a citizen of Austria, residing at Neunkirchen, Lower Austria, Empire of Austria-Hungary, have invented certain new and useful Improvements in Machines for the Manufacture of Pasteboard Boxes, (for which Letters Patent have been granted in the following countries: Austria, No. 46/4,533, dated November 11, 1896; Hungary, No. 6,490, dated March 5, 1896; Belgium, No. 120,188, dated March 6, 1896; France, No. 254,531, dated March 5, 1896; Great Britain, No. 4,987, dated March 5, 1896; Norway, No. 5,013, dated March 23, 1896; Switzerland, No. 11,935, dated March 5, 1896, and Turkey, No. 492, dated March 21, 1896;) and I do hereby declare the following to be a full, clear, and exact description of the invention, such as will enable others skilled in the art to which it appertains to make and use the same.

My invention relates to improvements in machines for making pasteboard boxes, and particularly to that class of machines designed for the making of boxes of rectangular form open at one end and formed from a blank consisting of a rectangular bottom piece with wings projecting therefrom which form the sides and end of the box.

My invention consists of the several parts constructed and arranged as will be hereinafter fully described and claimed.

Reference is had to the accompanying drawings, in which the same parts are designated by the same letters and numerals of reference throughout the several views.

Figure 2:
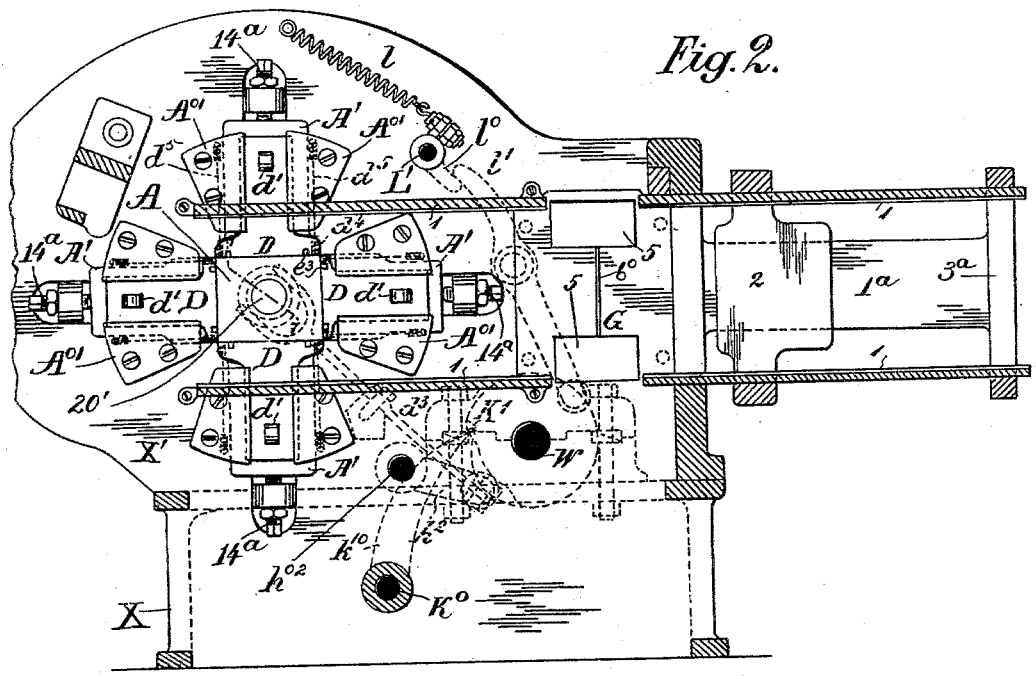
Figure 12:
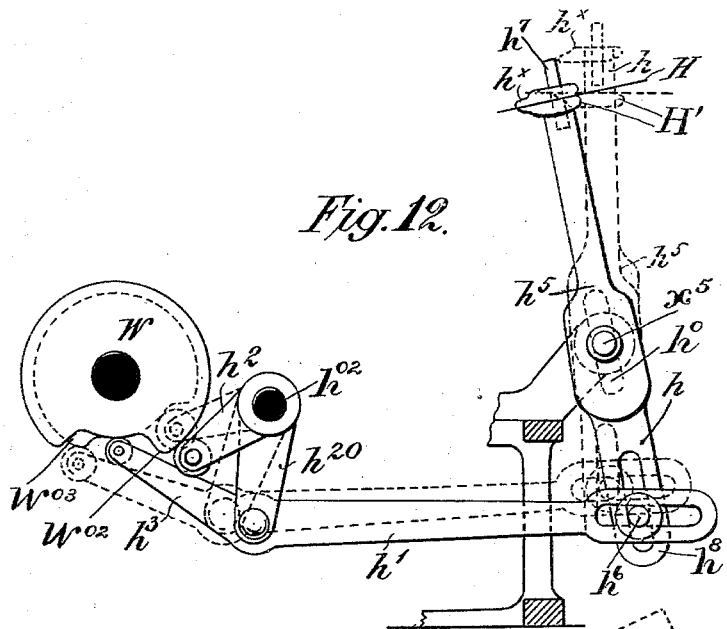
Figure 5:
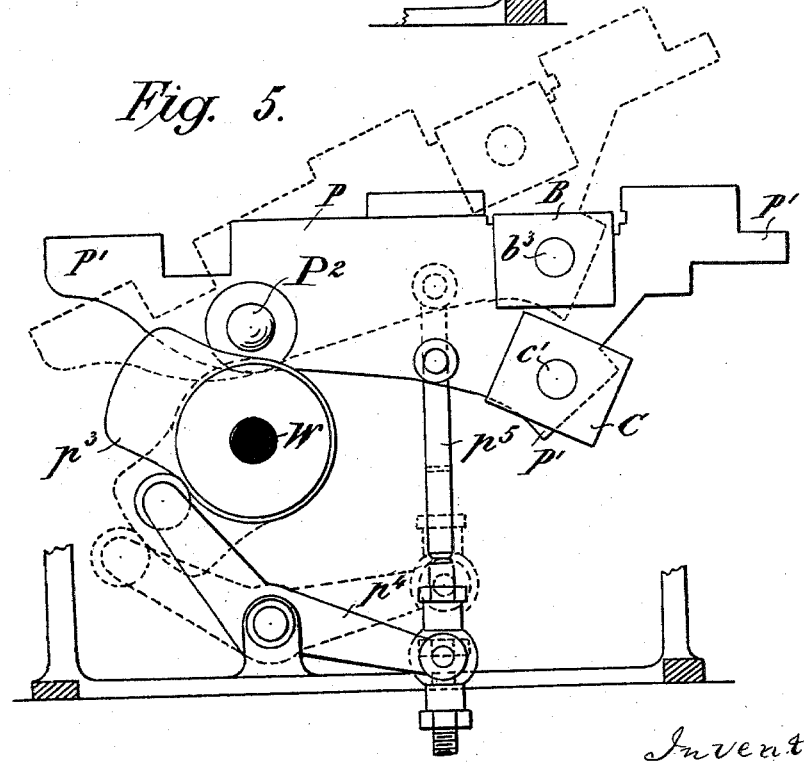

Figure 1 represents a plan of the machine, parts being broken away and one-half being shown in horizontal section through the axis of the mold-spindle. Fig. 2 represents a vertical transverse section of the machine, taken on the line II II of Fig. 1, looking in the direction of the arrows *a a*. Fig. 3 is a similar section taken on the same line and looking in the direction of the arrows *b b*. Fig. 4 is a plan view of the frame for holding the two die-spindles and part of the mechanism for operating the same. Fig. 5 is a diagrammatic end view of the said frame and its operating mechanism, the dotted lines showing the frame when raised. Fig. 6 is a horizontal longitudinal section through the die-spindle and parts carried thereby. Fig. 7 is a transverse section of the same, taken on the line 7 7 of Fig. 6. Fig. 8 is a sectional view taken through the corner-gripping device on the line 8 8 of Fig. 10. Fig. 9 is a transverse section through the die-spindle, taken on the line 9 9 of Fig. 6, looking in the direction of the arrows. Fig. 10 is a similar view taken on the line 10 10 of Fig. 6, looking in the direction of the arrows and showing the corner-gripping mechanism. Fig 11 is a plan view of the die-spindle and die, showing the relative position of the inner rod and disk as the die is withdrawn from the box. Fig. 12 is a detail view showing in elevation the mechanism for actuating the adhesive strip. Fig. 13 is an elevation of the same, looking at the opposite side and showing in section the cutters for cutting off the adhesive strip and the pawls for preventing backward motion of the same. Fig. 13$^a$ is an elevation of the same as seen from the back of the machine. Fig. 14 is a plan view of the same. Fig. 15 is a detail view, in front elevation, partly in section, of the mechanism for cutting the pasteboard blanks, the sectional part being taken on the line 19 19 of Fig. 16. Fig. 16 is a horizontal section of the same, taken on the line 20 20 of Fig. 15, showing also the means for reciprocating the cutters. Fig. 17 is a side elevation of the cutting devices, the support and guide for which are shown in section on the line 21 21 of Fig. 16. Fig. 18 is a side elevation of the blank and end of the strip from which it is cut. Fig. 19 represents a plan view of the blank on a larger scale. Fig. 20 represents a section through the mold and die, showing the blank in the first part of the process of forming the box. Fig. 21 is a similar view of one-half of the same parts, showing the corner-gripping device in operation. Fig. 22 is a similar section showing the die and blank removed from the mold to receive the adhesive strip. Fig. 23 is a detail view, partly in section and partly diagrammatic, showing the die and box in position for the folding-slides to fold the edges of the said strip down upon the bottom of the box. Fig. 24 is a similar view showing the said bottom edges of the strip folded down upon the bottom of the box. Fig. 25 is a similar view showing the box in the mold, the die withdrawn, and the folders in position to fold the upper edges of the strip over the edges of the box. Fig. 26 is a similar view showing the said edges of the strip folded down within the box. Fig. 27 is a similar view showing the finished box removed from the mold upon the second die. Fig. 28 is a view of the bottom of the box, showing the edges of the adhesive strip folded thereon. Fig. 29 is an end elevation of a modified frame for carrying the two die-spindles. Figs. 30, 31, and 32 show in side elevation another modification, in which the second die is swung in front of the first die, and Fig. 33 is a plan, partly in section, of the same. Fig. 34 is a detail elevation of the sliding frame for feeding the pasteboard strip to the machine, the guides being shown in section. Fig. 35 is a detail perspective view of the pawl for holding the die-spindle from rotation. Fig. 36 is a side elevation of the arm and plate for holding the adhesive strip on the die, showing the rings for operating the same.

A designates the mold, which is formed of four blocks $A'$, mounted upon the frame $X'$, projecting upward from the base X of the machine. The blocks $A'$ are mounted to slide slightly toward and away from the center of the mold. At the center of the mold the frame $X'$ is perforated to receive the spindle 20, having the disk $20'$ at its end within the mold, which disk is countersunk to lie flush with the bottom of the mold, and the said spindle extends through the said frame $X'$ and is supported at its outer end in the bearing $X^2$, secured to the base X of the machine. This spindle is adapted to slide longitudinally in its bearings and is actuated at the proper times by the lever $a'$, pivoted on the support $X^3$ and extending into the cam-groove $w$ in the cylinder $W'$, mounted upon the driving-shaft W, which latter extends longitudinally through the machine and is supported in suitable bearings in blocks $X^4$ at the ends of the base X, and the said driving-shaft is adapted to receive motion from any suitable source of power.

Two pairs of curved levers 14 14 are pivoted in the frame $X'$ and have adjusting-screws $14^a$ in their short arms which bear upon the ends of the blocks $A'$. The long arms of the levers 14 are curved, so as to approach the spindle 20, and have rollers journaled in their ends which rest upon the cone-shaped portion of the sleeve $14^\times$, mounted to slide upon the spindle 20 and actuated by the lever $a$, fulcrumed on the support $X^3$ and extending into the groove $w'$ in the cylinder $W'$ upon the driving-shaft W, which groove is so formed as to move the sleeve $14^\times$ to force the mold-blocks $A'$ together at proper times. Springs $a^2$, connected to lugs on the mold-blocks $A'$ and to any suitable place on the frame $X'$, serve to pull the mold-blocks apart when the sleeve $14^\times$ is moved in the opposite direction.

On the face of each block $A'$ slides a flat piece D, the inner edges of which are normally flush with the inner edges of the mold-blocks $A'$. These sliding pieces are held in their normal position by bell-crank levers $d'$, fulcrumed at $d$ and extending through slots in the blocks $A'$. The two horizontal bell-crank levers $d'$ have one arm connected with the sliding sleeve $d^{2\times}$, mounted on the spindle 20, to cause the two levers to move simultaneously, and one of these levers is provided with a third arm $d^{3\times}$, which extends into the cam-groove $w^2$ in the cylinder $W^3$ on the driving-shaft W.

The two bell-crank levers $d'$ for operating the vertical slides D are connected with arms $D^2$, (shown in dotted lines in Fig. 1,) which extend from the sleeve $d^2$, mounted to slide upon the spindle 20, and the said sleeve $d^2$ is operated by a lever $d^3$, which extends into the cam-groove $w^3$ in the cylinder $W^3$ on the driving-shaft W. The arrangement of the cam-grooves $w^2$ and $w^3$ is such as to cause the pieces D to approach each other and return to their normal positions in pairs acting alternately. This movement of the sliding pieces D is for the purpose of folding the edges of the adhesive strip down upon the bottom of the box, as will be hereinafter explained.

In recesses in the inner corners of the sliding pieces D are pivoted the folding-arms $d^4$, which have short arms $d^{04}$ projecting therefrom and forming an acute angle with the arms $d^4$. To the short arms $d^{04}$ are pivoted rods $d^5$, which extend into slots $a^{0'}$ in the face-pieces $A^{0'}$ and have caps or disks $d^{51}$ attached to their upper ends. Coiled springs $d^{52}$ are placed around the ends of the rods $d^5$ to press against the disks $d^{51}$. While the blocks D are in their normal positions, the arms $d^4$ rest against the faces of the mold-blocks $A'$, while the short arms $d^{04}$ lie close to the sides of the said mold-blocks, as shown in Fig. 23. The purpose of these arms $d^4$ is to fold the edges of the adhesive strip down inside of the edges of the box. This is accomplished when the pieces D descend below the edges of the mold-blocks $A'$, when the tendency of the spring $d^{52}$ is to pull up on the short arms $d^{04}$ and turn the arms $d^4$ into a horizontal position below the mold-blocks $A'$, as shown in Fig. 24. Should the box be in the mold, these arms $d^4$ would turn inside of the said box and fold the edge of the adhesive strip down, as will be hereinafter explained.

The frame $P'$ is mounted on trunnions $P^2$, supported in bearings $X^5$, and carries in suitable bearings two spindles $b$ and $c'$, respectively. The spindle $b$ is normally in line with the mold-spindle 20 and carries at its end a die B of the same shape as the inside of the mold and of such size as to fit within the said mold, leaving room for the sides of the box between the mold and die. The spindle $c'$ is arranged below the spindle $b$ and carries at its end a die C of the same size and shape as the die B.

The frame P' is supported in its normal position upon the vertical rod $p^5$, arranged to slide in suitable bearings in the frame of the machine and pivoted to the end of one arm of the bent lever $p^4$, the opposite end of which lever extends into the path of the cam $p^3$ on the driving-shaft W and has an antifriction-roller mounted in its end to roll upon said cam. The action of the said cam $p^3$ upon the bent lever $p^4$ rocks the frame P' on its trunnions and brings one or the other of the dies B C in front of the mold A, as shown in solid and dotted lines in Fig. 5. The die-spindles $b$ and $c'$ are mounted to slide longitudinally in the frame P', and the spindle $b$ is capable of being rotated in its bearings also. The flanged sleeve $b^0$ is rigidly secured to the spindle $b$ and has the sleeve $b^{0'}$ rotatably mounted thereon, to which latter sleeve is pivoted the end of the lever $b'$, fulcrumed upon the central piece $P^0$ of the frame P' and extending into the cam-groove $w^4$ in the cylinder $W^4$ on the driving-shaft W. This cam-groove $w^4$ is of such a shape that it will actuate the lever $b'$ to slide the die-spindle $b$ toward the mold A and cause the die B to enter the said mold at the proper times, as will be hereinafter explained.

On the end of the die-spindle $b$, near the die B, is mounted the ring E, having the hub $E^0$, which encircles the said spindle $b$, but is free to slide thereon. The die-spindle $b$ is hollow and has a second hollow spindle or tube E' arranged therein and extending nearly the entire length thereof, and to this inner spindle E' is secured the hub of the ring E by means of the screws $e^0$, which extend through slots $b^{00}$ in the die-spindle $b$, as shown in Fig. 6. The flanged sleeve $b^{20}$ is arranged to slide upon the spindle $b$ and is connected by screws $b^{21}$ with the inner spindle E', which screws extend through slots $b^{22}$ in the die-spindle $b$, thus allowing the sleeve $b^{20}$ and spindle E' to slide together and carry the ring E without moving the die-spindle $b$.

The ring E is provided with four radial arms $E^2$, which are perforated longitudinally to receive rods $e$, the axial lines of the said perforations and rods being parallel with diagonals drawn on the face of the die B. Each of the rods $e$ is provided at its outer end with two pins $e'$, which extend over the corners of the box, as shown in Fig. 10, in which the dotted lines indicate the relative position of the box on the die.

The flanged sleeve $b^{20}$ is provided with the sleeve $b^{23}$, to which is attached one end of the lever $e^2$, fulcrumed on the cross-piece $P^0$ of the frame P', the other end of the said lever $e^2$ extending into the cam-groove $w^5$ in the cylinder $W^4$, which cam-groove is formed so as to move the said lever at the proper times to slide the ring E toward or away from the die B. Between the ring E and the die B is mounted the ring 15, having both edges beveled and free to slide on the said spindle for a distance limited by the stops $b^{15}$ and $b^{16}$, and when the ring E is moved toward the die B the inner ends of the rods $e$ will push the ring 15 along the spindle until it strikes the stop $b^{15}$, when they will ride up the beveled edge of said ring, which will cause the said rods to slide outwardly, carrying the pins $e'$ beyond the corners of said die B. As the ring E continues to approach the die B the pins $e'$ will pass over the corners of the said die, and when the rods $e$ ride down the other inclined edge of the ring 15 the action of suitable springs (shown at $e^4$) will cause the pins $e'$ to fall upon the sides of the die, on each side of the corners thereof, as shown in Fig. 10.

The rod $b^2$ extends entirely through the die-spindle $b$ and inner spindle E' and carries on its end a disk $b^3$, which is countersunk in the face of the die B and normally remains flush therewith, as shown in Fig. 6; but when it is desirable to remove the box from the die the said rod $b^2$ and disk $b^3$ may be moved outwardly with relation to the die, as shown in Fig. 11. This relative movement of the die and disk is caused as follows: The slot $b^{24}$ is formed through the die-spindle $b$ and the inner spindle E', and the annular groove $b^{25}$ is formed in the rod $b^2$, within the limits of the slot $b^{24}$. The lever $18^\times$ is pivoted in the frame P' of the machine in such a position that one end will enter the slot $b^{24}$ and the annular groove $b^{25}$ in the rod $b^2$. The other end of the lever $18^\times$ extends to the periphery of the cylinder $W^4$, which latter is provided with a rib partly encircling the same and which holds the end of the lever $18^\times$ out of the groove $b^{25}$ until the die B is about to leave the box in the mold, when the lower end of the lever $18^\times$ will pass off of the rib on the cylinder $W^4$ and allow the upper end of said lever to fall into the groove $b^{25}$ in the rod $b^2$, and thus as the die-spindle and die are moved backward the rod $b^2$ will be held from movement, causing the disk $b^3$ to hold the box in the mold until the die and the gripping-pins $e'$ are withdrawn therefrom. After the die has been withdrawn from the box the lower end of the lever $18^\times$ will again ride upon the rib on the cylinder $W^4$ and raise the said lever out of the groove $b^{25}$, when the rod $b^2$ and disk $b^3$ may be moved back by any suitable means—as, for instance, by the lever $b'$, extended beyond the sleeve $b^0$ on the spindle $b$, as at $b^{10}$, and in position to strike a stud 18 on a sliding bar $b^4$, arranged to slide in a suitable guide-slot $p^0$ in the frame P'. At the opposite end of the sliding bar $b^4$ is a similar stud $18'$, arranged to strike a lever $b^5$, which lever is pivoted to the frame P' at one end and fastened to a sleeve $b^{26}$ on the spindle $b$ at its other end. This sleeve $b^{26}$ is hollowed out on the inside, as shown in Fig. 6, to receive a disk $b^{27}$, which is slightly larger in diameter than the spindle $b$. This disk $b^{27}$ extends through the slots $b^{28}$ in the die-spindle $b$ and the inner spindle E′ and also through a short slot in the rod $b^2$. When the lever $b'$ in moving the die-spindle back nears the end of its stroke, its end $b^{10}$ will impinge against the stud 18 on the sliding bar $b^4$ and move the latter also. The stud 18′, acting on the lever $b^5$ near its fulcrum-point, will cause its opposite end to move the sleeve $b^{26}$ rapidly backward, thus drawing the rod $b^2$ and disk $b^3$ back to their normal positions within the die-spindle and die. It is obvious that in smaller machines this mechanism for moving the rod and disk back may be dispensed with and a spring used in place thereof, which will accomplish the same result.

A keyway $b^\times$ is formed in one side of the spindle $b$, and a ratchet-wheel $F^5$, having a key $F^\times$ to slide in the said keyway, is mounted to slide on the said spindle and to rotate therewith. A disk $F^6$ is rotatably mounted on the said spindle close to the ratchet $F^5$, and the said disk and ratchet are held close together and in the same relative position to the frame of the machine between the bearings $P^3$ and $P^4$ on the frame P. Thus the spindle is free to slide through the ratchet $F^5$ and disk $F^6$. A pawl $f^0$ is pivoted on one side of the disk $F^6$ to engage the teeth on the said ratchet, and on the other side of the said disk is secured a pinion $f^6$, having teeth which mesh with a rack $f^7$, arranged to slide in the frame P′. Motion is imparted to the rack $f^7$ by the lever $f^8$, fulcrumed to the cross-piece $P^0$ of the frame P′ and so bent that one end will extend into a slot in the rack $f^7$, while the other end will extend into the cam-groove $w^6$ in the cylinder $W^4$. The cam-groove $w^6$ is so shaped that the rack will move far enough to cause the spindle $b$ to make one revolution as the rack moves in one direction; but as the rack moves back the pawl $f^0$ will slip over the teeth on the ratchet $F^5$, so that the spindle will not be turned.

To prevent the spindle $b$ from being turned accidentally, a disk 17 is secured thereon, and a long pawl $17^\times$ is arranged to engage a notch in the said disk 17 and so hold the shaft from rotation. The pawl $17^\times$ is made long enough to remain in engagement with the notch through the entire sliding movement of the spindle $b$. This pawl $17^\times$ is secured to a pair of levers $17^0$, pivoted to the frame P′ and having an extension $17^a$, provided with a roller $17^b$, reaching to the cylinder $W^4$, which is provided with any suitable means—as, for instance, a cam $w^{04}$ (see Fig. 35)—for tripping the said levers and throwing the pawl $17^\times$ out of the notch in the disk 17 to allow the spindle $b$ to begin its revolution, after which it will drop back against the periphery of the disk 17 until the revolution is completed, when the pawl $17^\times$ will fall in the notch in the disk 17 and hold the spindle $b$ from rotation, as before. The collar $f^2$ is mounted to slide upon the spindle $b$ and has pivoted thereto the curved arm $f^\times$, carrying at its outer end the plate F, adapted to be brought in contact with the side of the box on the die, for a purpose to be hereinafter explained.

The arm $f^\times$ is provided, just back of its fulcrum-point, with a lip $f^{20}$, and a second ring F′ is also arranged to slide on the spindle $b$ and is provided with a beveled edge $f^{10}$, which is adapted to pass beneath the lip $f^{20}$ and thus force the arm $f^\times$ down until the plate F presses against the side of the box on the die B. The ring F′ is provided with an annulus $f'$, and the lever $f^3$, notched at its end to engage the said annulus, is fulcrumed to the frame P′ and connected with a second lever $f^5$ by the link $f^4$. This second lever $f^5$ is fulcrumed upon the cross-piece $P^0$ of the frame P′ and extends in the path of the cam $w^7$ on the cylinder $W^4$, which will act upon said levers to move the ring F′ toward the ring $f^2$ and beneath the lip $f^{20}$ to cause the arm $f^\times$ to descend upon the side of the box at the proper time, for a purpose to be hereinafter explained. The forward movement of the ring $f^2$ is limited by the stops $f^5$, and the said ring is connected with the ring F′ by slotted links $f^3$, which will permit the ring F′ to move far enough away from the ring $f^2$ to withdraw the beveled edge $f^{10}$ from beneath the lip $f^{20}$ of the arm $f^\times$, after which the ring $f^2$ will be drawn after the ring F′ in its backward movement, as will be readily understood by reference to Fig. 36 of the drawings.

The die C is carried on the end of the spindle $c'$, mounted to slide in suitable bearings in the frame P′, and the sliding movement is imparted thereto by a lever $c^3$, (shown in dotted lines in Figs. 1, 3, and 4,) which is fulcrumed to the frame P′ and extends into the cam-groove $w^8$ in the cylinder $W^4$, which groove is so formed as to cause the die C to move into the box in the mold and to withdraw the said box from the mold when finished. Two strips 19 19 are secured to the face of the frame P′, one on each side of the die C, and serve the double purpose of keeping the said die and spindle $c'$ from turning in their bearings and to strip the finished box from the said die as the latter nears the end of its backward movement.

Pivoted on a suitable support or bracket $x^4$ on the base X is the lever $h^5$, which carries at its upper end the table or jaw H′, over which a strip of paper or other suitable material H, having an adhesive substance spread over its lower side, is arranged to move. A second lever $h$, having the flat jaw $h^\times$ at its upper end, is supported on the same pivot $x^5$ with the lever $h^5$, but is provided with a slot $h^0$, through which the pivot extends, thus allowing the lever $h$ to move vertically as well as about its pivot. The lever $h^5$ is provided at its upper end with a guide-piece $h^7$, extending longitudinally from the end thereof, and which guide-piece extends through the jaw $h^\times$ on the lever $h$, thus causing the two levers to move together above their pivot $x^5$, but allowing the lever $h$ to slide longitudinally on the lever $h^5$. The lever $h$ is somewhat longer than the lever $h^5$ and extends below it, as at $h^8$, for a purpose to be hereinafter explained. The shaft $h^{02}$ is journaled in suitable bearings on the base X and has at one end the arm $h^2$, actuated by the cam $W^{02}$ on the shaft W, and at its other end an arm $h^{20}$, to which is pivoted the lever $h'$, one end of which is adjustably connected with the lower end $h^8$ of the lever $h$, as at $h^6$, and the other end $h^3$ is extended into the path of the cam $W^{03}$ on the driving-shaft W, all as shown in Figs. 12 to 14. By inspection of the said figures it will be seen that when the end of the lever $h^3$ passes off the cam $W^{03}$ it will allow the lever $h$ to fall, which action is assisted by the spring $h^4$, which tends to pull the lever $h$ downwardly and which will press the flat jaw $h^\times$ down upon the table H' or upon the adhesive strip H upon the said table, and the movement of the arm $h^2$, caused by the cam $W^{02}$, will cause the arm $h^{20}$ to move the lever $h'$ and cause the jaws on the upper ends of the two levers $h$ and $h^5$ to approach the box on the die B until the end of the adhesive strip is placed on one side of the said box, as shown in Fig. 13, after which the cam $W^{03}$ will act on the end $h^3$ of the lever $h'$ to raise the lever $h$ and release the said adhesive strip from between the jaws H' and $h^\times$.

When the adhesive strip has been wound once around the box, it is cut off by the cutting device K, which consists of an upper and lower frame K' and K², respectively, pivoted together at $k^0$ and supported in the frame I. The frames K' and K² are provided with knives or cutting edges $k^3$ and $k^4$, respectively. The frame K' is provided with an extension $k^5$, to the end of which is pivoted a rod $k'$, connected at its other end to an arm $k$ on the shaft $K^0$, having at its other end the arm $k^{10}$, Fig. 2, extending into the path of a cam on the shaft W. The lower frame K² is connected by the rod $k^2$ with the same arm $k$, so that when the said arm moves downwardly the rod $k^2$ will move the lower frame downwardly, and the rod $k'$, pulling on the extension $k^5$, will move the frame K' upwardly and thus open the knives or cutting edges $k^3$ and $k^4$. When the arm $k$ is moved upwardly, the movements are reversed and the knives are brought together. The adhesive strip H is arranged to pass through the frame I, where it is held from backward movement by retaining-pawls $i$, through the frames K' and K², and between the knives $k^3$ and $k^4$, where it is cut off at the proper times.

The pasteboard blanks may be fed to the machine in any suitable manner; but I prefer to use a plain strip of pasteboard, which is fed to the machine between guides 1 1 and between the vertical guides $3^a$, in which are pivoted check-pawls 3, which prevent backward movement of the strip, and the said strip is caught by the reciprocating frame 2, having the pawl $3^\times$, which engages the said strip of pasteboard at its lower edge. The frame 2, as shown in Fig. 34, is a three-sided frame arranged to slide on the guides 1 1 and $1^a$, the upper and lower ends thereof being connected together by a bolt or rod $2^\times$, which carries at its lower end, just over the lower guide 1, the pawl $3^\times$ and near its middle the block $2^b$. To the block $2^b$ is pivoted the eye $2^c$ of the eyebolt $2^a$, which eyebolt is free to slide in a slot in the upper end of the lever 12. A reciprocating motion is imparted to the frame 2 by means of the lever 12, fulcrumed to the base X of the machine at $x^{12}$ and having its upper end connected with the said frame 2 at $2^a$ and its lower end adjustably connected at $12^a$ with a link 13, connected to one arm of the lever $x'$, the other arm of which lever extends into the path of a cam on the shaft W, so placed as to impart to the said lever $x'$ and the parts connected therewith a reciprocating motion. The bolt $2^\times$ is free to turn in the ends of the frame 2. From inspection of Figs. 1, 3, and 34 it will be seen that when the lever 12 moves the frame forward it will pull upon the eyebolt $2^a$, thus turning the rod $2^\times$ in the direction to cause the pawl $3^\times$ to press against the strip of the pasteboard and move the same forward, and when the lever 12 moves backward it will turn the said bolt $2^\times$ in the direction to cause the pawl $3^\times$ to turn away from the pasteboard, which latter will be held from backward movement by the pawl 3. The frame 2 moves the pasteboard strip along to the cutting device G by a step-by-step movement, where it is cut to the shape shown in Fig. 18. This cutter G consists of two punches 4 4, one at the top and one at the bottom, and a knife 6, extending from one of the said punches to the other. The two punches and the knife are arranged to be pressed into two spaces 5 5' and the groove $6^0$ in the piece of metal G', secured to the frame of the machine in the proper position to receive them, as shown in Figs. 1, 15, 16, and 17. The cutter G, carrying the said punches and knife, is arranged to slide in the piece $G^\times$, secured to the frame of the machine, and the said cutter is provided with a tailpiece $g$, which extends near the periphery of the cylinder $W^4$ and has journaled to its end the roller $g'$, which extends into the cam-groove $w^4$ on the said cylinder $W^4$, and thus reciprocates the cutter at the proper times. The blank after being cut is pushed forward by the pawl 8, pivoted on a block 8', mounted to slide on the lower guide 1, and pivoted at its other end to the end of the rod 9', which is arranged to slide in suitable bearings in the frame of the machine and is provided at its other end with the rack $9^\times$. The toothed segment 9 is pivoted to the frame of the machine in such a position as to mesh with the teeth on the rack $9^\times$, and the said segment is provided with the slotted arm $9^a$ (shown in dotted lines in Fig. 3) and arranged to receive the pin $12^b$ on the lever 12, whence it follows that the reciprocating movement of the lever 12 will be imparted to the rod 9' and pawl 8 through the segment 9 and rack 9×. The pivotal motion of the pawl 8 on the block 8' is limited by a stop 8ª, so that as the rod 9' moves forward the pawl 8 will strike the said stop 8ª when the said pawl has turned far enough to press against the pasteboard blank, and the further movement of the rod will slide the block along the guide 1, carrying the pasteboard blank with it. When the rod 9' moves backward, it will pull upon the pawl 8 in the direction to turn its end away from the pasteboard blank and drag the block 8' backward along the said guide 1. The pawl 10 is pivoted on the bent end of the rod 11, which is arranged to slide in the frame of the machine and is connected to the lever 12 at 12ᶜ and is reciprocated thereby. The purpose of the pawl 10 is to move the pasteboard blank in front of the mold in position to be forced into the mold by the die B.

The operation of the invention is as follows: The pasteboard band of the required width is fed into the machine by any suitable means and enters in an upright position into the guide 1, Figs. 1 to 3, in which it receives a step-by-step forward motion by means of feed devices consisting of a pawl $3^\times$, carried by the reciprocating frame 2, which pawl is made to press against the pasteboard during the forward motion, but slide over the same at the backward motion of frame 2, during which the band is prevented from receding by a counter-pawl 3, pivoted to one of the vertical guides 3ª. The pasteboard band brought in this manner in front of the cutting device G is cut off by the knife 6 and punches 4 4 in the shape indicated in Fig. 18, each cut cutting the rear end of one blank and the front end of the next blank, thus forming a finished blank at each cut. The blank is then pushed forward by the pawl 8, which is operated by the rack $9^\times$ and segment 9, until it is caught by the pushing-pawl 10, which at the next movement pushes the blank in front of the mold A in position to be acted upon by the die B. The cam-groove $w^4$, which actuates the lever $b'$, is so formed that it will move the die B into the mold as soon as the blank is in the proper position in front of said mold. As the die moves into the mold the central rectangular portion S of the blank will be carried to the bottom of the mold and the sides or wings $s$ will be bent down upon the sides of the die in the form of the finished box. As soon as the die has reached the bottom of the mold the cam-groove $w'$ will act on the lever $a$ to move the sleeve $14^\times$ and through the levers 14 move the mold-blocks toward the center of the mold, thus pressing the wings $s$ of the blank closely against the sides of the die B. While the wings are in this position the cam-groove $w^5$ will act on the lever $e^2$ to move the gripping device E toward the die B. As the rods $e$ ride over the ring 15 the pins $e'$ will be forced outwardly and pass over the sides of the box on each side of the corners, as shown in Fig. 10, the pins $e'$ entering the recesses $e^3$ in the sliding pieces D and mold-blocks A'. When the rods $e$ have passed the ring 15, the springs $e^4$ will cause the pins $e'$ to press upon the sides of the box and so hold the said sides or wings close down upon the die B. The cam-groove $w^4$ will at this time move the lever $b'$ in the direction to move the die out of the mold, bringing with it the blank S, which is held on the said die in the form of a box. At the time the die begins to move out of the mold the lever $a$ and sleeve $14^\times$ will be moved in the direction to loosen the mold-blocks A' and the spindle 20 will be moved forward by the lever $a'$, acted upon by the cam-groove $w$, and will follow the movement of the die B, thus pushing the box out of the mold with the said die, after which the said spindle 20 is moved back to its normal position. As soon as the die B has moved out of the mold the levers $h'$ $h^3$ and $h^2$ $h^{20}$ will be acted upon by their respective cams and will first move the lever $h$ downwardly to bring the plate $h^\times$ down upon the adhesive strip H upon the table H' and then to move the upper ends of the levers $h$ and $h^5$ toward the box on the die B until the end of the adhesive strip is brought against the side of the box. While these movements are taking place, the cam $w^7$ is acting upon the lever $f^5$ to move the rings $f'$ and $f^2$ toward the die B, and these movements are so timed that when the adhesive strip H touches the side of the box the lever $f^\times$ will bring the plate F down upon the end of the said adhesive strip and hold the same against the box. As soon as the plate F has taken hold of the end of the adhesive strip the lever $h$ will be moved upwardly to release the adhesive strip, and then both the levers $h$ and $h^5$ will be returned to their normal position by their respective cams on the shaft W, the adhesive strip being held from backward movement by the pawl $i$ in the frame I. At this time the lever $f^8$ is acted upon by the cam-groove $w^6$ to move the rack $f^7$ and cause the spindle $b$ and die B to make one complete revolution. When the die has made about three-quarters of its revolution, the lever $f^5$ is returned by a cam, similar to the cam $w^7$, in the proper position upon the cylinder $W^4$, which movement will withdraw the arm $f^\times$ and plate F in time to prevent the adhesive strip from being placed over it. The roller L is journaled in the arm 16, mounted on the shaft L', and the said roller is pressed against the adhesive strip by means of a spring $l$, (see Fig. 2,) secured to the shaft L', while the said adhesive strip is being wound on the box, and serves to roll the said adhesive strip smoothly upon the box. The toe $l^0$ is also secured to the shaft L' and extends in the path of the lever $l'$, arranged to be acted upon by a cam on the shaft W to move the said roller away from the box at the proper time. As the levers $h$ and $h^5$ move away from the box the lever $k$ is moved by its cam to raise the rods $k'$ $k^2$ and close the blades $k^3$ $k^4$, which will cut the adhesive strip off. As soon as the spindle $b$ and die B have made one complete revolution they will stop and the pawl $17^\times$ will drop into the notch in the disk 17 and thus hold the said spindle from further rotation, and as the rack $f^7$ is returned to its original position the pawl $f^0$ without rotating the said spindle. As soon as the die stops the roller L is moved away from the box, and the die-spindle and die are once more moved toward the mold; but the cam-groove $w^4$ is so shaped that this time the die will stop with the bottom of the box flush with the faces of the sliding pieces D on the mold-blocks $A'$ and the edge of the adhesive strip, which is somewhat wider than the box and projects on each side thereof, extending inside of the mold. While in this position the two vertical sliding pieces D are moved toward the center of the mold by means of the lever $d^3$ and the cam-groove $w^3$, the other pair of sliding pieces remaining stationary and acting as guides for the moving pair. This will fold the edges along the upper and lower sides of the box down upon the bottom thereof, and as soon as this is accomplished the vertical pair of sliding pieces D return to their normal position and the horizontal pair of sliding pieces D are similarly moved by the levers $d'$ and $d^{3\times}$ and the cam-groove $w^2$ to fold the edges of the strip at the end of the box down upon the bottom thereof. It is obvious that either the vertical or horizontal pair of sliding pieces D may be set to move first, as may be desirable. When these sliding pieces have folded the bottom edges of the strip down upon the bottom of the box, the die-spindle and die, with the box therein, will be moved into the mold and the die-spindle and die will be immediately withdrawn; but this time the pawl $18^\times$ will be released by its cam on the cylinder $W^4$ and will drop through the slot $b^{24}$ into the annular groove $b^{25}$ in the rod $b^2$, and as the die and spindle move out of the mold the rod $b^2$ will be held from movement and the disk $b^8$ will hold the box in the mold, the die B and the gripping-pins $e'$ being drawn out therefrom, and the die-spindle and the several parts carried thereby will all be moved back to their initial positions as soon as the die is clear of the box. The box is in the mold with its edges flush with the faces of the mold-blocks $A'$ and the edges of the covering-strip extending into the path of the sliding pieces D, which latter are now moved in pairs, as before, toward the center of the mold; but in this instance they first fold the edges of the covering-strip down at right angles to the sides of the box and then the levers $d^4$ operate to fold the paper down inside of the box, as will be readily understood by reference to Figs. 25 and 26. The cam $p^3$ on the shaft W is arranged to act on the lever $p^4$ just as the levers $d^4$ complete their work of folding the edges of the covering-strip down within the box, and the said lever $p^4$ will raise the rod $p^5$ and rock the frame $P'$ upward upon its trunnions, thus bringing the die C to the place formerly occupied by the die B. When the die C is in the proper position and the sliding pieces D have resumed their normal places, the cam-groove $w^8$ will act on the lever $c^3$ and move the die-spindle $c$ and the die C into the box in the mold A and immediately withdraw the same, the spindle 20 being again moved forward, following the die C and pushing the finished box from the mold. As the die C nears the frame $P'$ and passes between the strips 19 thereon the said strips will push the finished box from the die C, allowing it to fall into any suitable receptacle. As soon as the finished box is delivered from the machine the frame $P'$ and the parts connected thereto will be returned to their normal positions by the cam-grooves in the several cylinders on the driving-shaft W and the same operations will be repeated in the formation of another box.

In Fig. 29 I have shown a modification of the mechanism for raising the die C in front of the die B. In this instance the vertically-sliding frame P takes the place of the rocking-frame $P'$ and is moved vertically by the lever $p$, operated by the cam $p'$ on the second driving-shaft $W^\times$, journaled on the other side of the machine.

In Figs. 30 to 33 I show still another device for accomplishing the same result, in which both the rocking and sliding frames are dispensed with and the second die C is supported in the frame $c^4$, the sides of which are provided with slots $c^8$, through which the pivot-pins $c^7$ pass. The said pivot-pins $c^7$ are secured to the frame of the machine in such a position as to support the die C below the die B. A pair of rods $c^6$ are pivoted to the frames $c^4$ at $c^5$ and are arranged to be moved forward at the proper times by suitable cams on the shaft W. The forward movement of the rods $c^6$ will first swing the die C in front of the die B and then move it forward into the box in the mold A, and the backward movement of the said rod will draw the die C and the box out of the mold A. A pair of bell-crank levers $c^9$ are pivoted on hangers $c^{60}$, depending from the rods $c^6$, one arm of the said bell-crank lever extending forward by the side of the die C and the other arm thereof extending upwardly by the side of the rods $c^6$ in the path of the stud $c^{10}$, projecting from the frame of the machine. Springs $c^{11}$ are arranged to hold the horizontal arms of the bell-crank lever $c^9$ upwardly above the sides of the box on the die C, but as the rods move backwardly the vertical arms of the said bell-crank levers will strike the stops $c^{10}$, causing the other arms thereof to move down the side of the die C and remove the box therefrom.

If desired, a label may be pasted on the finished box while it is still on the die C, any suitable means being employed for this purpose.

With the above-described machine boxes of different sizes can be made by changing the mold and dies or by fixing on or removing cheeks fixed by means of screws with countersunk heads. The last-named means are employed if boxes of a very small depth are to be made. The stroke of the dies is in this case varied either by shifting the actuating-levers or by changing the corresponding cams and the feed of the pasteboard and the forward motion of the guide-table H for the covering-strip is also suitably modified.

It will be obvious that the above-described machine can be modified in various ways without departing from the nature of the said invention, and I therefore do not limit myself to the exact details of construction as described. Thus the second plunger or die C may be dispensed with and the first die B may be caused to enter the finished box in the mold A after the front edges of the covering-strip have been turned inward and pressed onto the sides of the box for the purpose of drawing the box out from the mold A. It is only necessary for this purpose to suitably shape the cam-groove actuating the spindle $b$ of the die B. The box would then be moved from the die B by pushing forward the spindle $b^2$ with the head $b^3$, no separate stripping-off plates, such as 19, or stripping-levers, such as $c^9$, being then necessary. The mechanism for actuating the spindle $b^2$ for this purpose may be the same as that already described for pushing the said spindle forward for the purpose of retaining the box in the mold A at the first withdrawal of the die B from such box. It is, however, preferred to use the second die C in those cases when a label has to be pasted onto the finished boxes or an inscription printed upon them before they leave the machine.

Having thus described my invention, what I claim, and desire to secure by Letters Patent of the United States, is—

1. In combination with a rectangular mold formed of four blocks movable toward and from the center of the rectangular space inclosed by them, means for moving such blocks toward and away from such center, a die corresponding to such mold, means for pushing such die into the mold together with a cross-shaped blank for bending up the wings of the latter, means for holding the box thus partially formed fast on the die, means for drawing the die together with such box out of the mold, means for uniting the side edges of the partially-formed box and means for removing the blank with the side edges united from the die.

2. In combination with a rectangular mold a corresponding die, means for pushing such die into the mold together with a cross-shaped blank for bending up the wings of the latter, means for holding the box thus partially formed fast on the die, means for drawing the die together with such box out of the mold, a spindle in the axis of such mold, means for moving such spindle to and fro longitudinally, means for uniting the side edges of the partially-formed box and means for removing the blank with the side edges united from the die.

3. In combination with a rectangular mold a corresponding die, a hollow spindle for carrying the said die, means for pushing such die into the mold together with a cross-shaped blank for bending up the wings of the latter, a corner-grip consisting of pins located adjacent to the side edges of the die and parallel thereto, a ring for carrying the said pins, and a second hollow spindle within the first hollow spindle secured to the said ring; of means for moving the second hollow spindle within the first hollow spindle to move the said pins longitudinally toward and away from the die and of means for moving such pins radially or substantially so toward and away from the center of the die; means for drawing the die together with the partially-formed box out of the mold, means for uniting the side edges of such box and means for removing the blank with the side edges united from the die.

4. In combination with a rectangular mold formed of four blocks with recesses for the corner-grip pins to enter into, a spindle in the axis of such mold, means for moving such spindle to and fro longitudinally, a corresponding die, means for pushing such die into the mold together with a cross-shaped blank for bending up the wings of the latter, a corner-grip consisting of pins located adjacent to the side edges of the die and parallel thereto, of means for moving the said pins longitudinally toward and away from the die and of means for moving such pins radially or substantially so toward and away from the center of the die; means for drawing the die together with the partially-formed box out of the mold, means for uniting the side edges of such box and means for removing the blank with the side edges united from the die.

5. The combination with a rectangular mold, a corresponding die, means for pushing such die into the mold together with a cross-shaped blank for bending up the wings of the latter, a corner-grip consisting of pins located adjacent to the side edges of the die and parallel thereto, of guide-bolts in a frame for guiding such pins radially to the center of the die or nearly so, of means for moving the said frame along the die-carrying spindle, of a ring beveled at both ends and adapted to slide along such spindle and to engage with the guide-bolts of the corner-grip pins for moving the latter away from the center of the die, of springs tending to move the corner-grip pins toward the center of the die, and of stops for limiting the motion of the beveled ring along the spindle; means for drawing the die together with the partially-formed box out of the mold, means for uniting the side edges of such box and means for removing box with the side edges united from the die.

6. In combination with a rectangular mold a corresponding die, means for pushing such die into the mold together with a cross-shaped blank for bending up the wings of the latter, means for holding the box thus partially formed fast on the die, means for drawing the die together with such box out of the mold, a lever pivoted to the frame of the machine, a second lever pivoted and free to slide on the first lever, jaws on the two said levers, means for sliding one lever on the other to open and close the said jaws, and for turning the two levers about their pivot to apply an adhesive covering-strip to a side of the partially-formed box, means for holding it temporarily thereto, means for imparting one whole revolution to the die together with the box, means for removing the temporary holding device for the covering-strip from the box, means for cutting the covering-strip and means for removing the box with the side edges united from the die.

7. In combination with a rectangular mold a corresponding die, means for pushing such die into the mold together with a cross-shaped blank for bending up the wings of the latter, means for holding the box thus partially formed fast on the die, means for drawing the die together with such box out of the mold, a lever having a clamping-jaw on top adapted to slide longitudinally on its fulcrum, a second lever turning with the first but not moving longitudinally with it and supporting the free end of the covering-strip, means to turn the first-mentioned lever on its fulcrum toward and away from the die and the box and for moving it longitudinally on such fulcrum, means for preventing the backward movement of the covering-strip means for holding the covering-strip temporarily to the box, means for imparting one whole revolution to the die together with the box, means for removing the temporary holding device for the covering-strip from the box, means for cutting the covering-strip and means for removing the box with the side edges united from the die.

8. In combination with a rectangular mold, a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip to a side of the partially-formed box, a revolving gripper consisting of a plate pivoted to a frame carried by the die-spindle, of means for moving the said frame along the spindle, of means for turning the said plate down upon the box and covering-strip applied thereto and for raising it off therefrom; means for imparting one whole revolution to the die together with the box, means for cutting the covering-strip and means for removing the box with the side edges united from the die.

9. In combination with a rectangular mold a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip to a side of the partially-formed box, a revolving gripper consisting of a plate pivoted to a frame carried by and sliding along the die-spindle, of a beveled ring carried by and movable longitudinally relatively to such frame of means for moving the said beveled ring along the spindle together with the said frame, of a stop to arrest the longitudinal movement of the frame before the longitudinal movement of the ring is stopped, of an arm connected with the said plate and engaging with the beveled face of the said ring and of a spring tending to raise the plate off the box and covering-strip applied thereto; means for imparting one whole revolution to the die together with the box, means for cutting the covering-strip and means for removing the box with the side edges united from the die.

10. In combination with a rectangular mold a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip to a side of the partially-formed box, means for holding it temporarily thereto, a rack, means for moving it to and fro longitudinally, a pinion on the die-spindle engaging with such rack, means for coupling the die-spindle to the pinion when revolving in one direction and for uncoupling it therefrom when revolving in the opposite direction, means for normally preventing the die-spindle from revolving and means for liberating such die-spindle at proper times, means for removing the temporary holding device for the covering-strip from the box, means for cutting the covering-strip and means for removing the box with the side edges united from the die.

11. The combination with a rectangular mold of a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip to a side of the partially-formed box, means for holding it temporarily thereto, means for imparting one whole revolution to the die together with the box, a roller, means for pressing such roller against the box, means for raising it off therefrom, means for removing the temporary holding device for the covering-strip from the box, means for cutting the covering-strip and means for removing the box with the side edges united from the die.

12. In combination with a rectangular mold a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip projecting beyond the top edge of the partially-formed box to a side thereof, a ring on the die-spindle, an arm pivoted on the said ring having a plate on the free end thereof and a lip on the other end, a second ring having a beveled edge connected with the first ring, and having a limited movement in relation thereto, means for moving the second ring against the first ring with its beveled edge under the lip on the said arm to move the plate on the other end of the arm down on the said strip on the box to hold it thereto, means for imparting one whole revolution to the die together with the box, means for removing the temporary holding device for the covering-strip from the box, means for cutting the covering-strip, means for folding the edges of the covering-strip projecting beyond the top edge of the box down on the inside of the sides of the box and means for removing the box with the side edges united from the die.

13. In combination with a rectangular mold a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip projecting beyond the top and the bottom of the partially-formed box to a side thereof, means for holding it temporarily thereto, means for imparting one whole revolution to the die together with the box, means for removing the temporary holding device for the covering-strip from the box, means for cutting the covering-strip, pieces to slide on the faces of the mold-blocks to fold the edge of the covering-strip projecting beyond the bottom of the box down onto the outside of such bottom, levers pivoted in the backs of the said pieces and having spring-actuated arms for folding the edge of the covering-strip projecting beyond the top edge of the box down on the inside of the sides of the box and means for removing the box with the side edges united from the die.

14. In combination with a rectangular mold a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip projecting beyond the bottom of the partially-formed box to a side thereof, means for holding it temporarily thereto, means for imparting one whole revolution to the die together with the box, means for removing the temporary holding device for the covering-strip from the box, means for cutting the covering-strip, folding-slides adapted to slide on the front side of the blocks constituting the mold, mechanism for moving one pair of opposite slides toward the center of the mold simultaneously and for moving such slides back again, mechanism for subsequently moving the other pair of opposite slides toward the center of the mold and back again, means for moving the die with the box toward the mold until the bottom of the box is in a plane with the outer face of the folding-slides and means for removing the box with the side edges united from the die.

15. In combination with a rectangular mold a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip projecting beyond the top of the partially-formed box to a side thereof, means for holding it temporarily thereto, means for imparting one whole revolution to the die together with the box, means for removing the temporary holding device for the covering-strip from the box, means for cutting the covering-strip, folding-slides adapted to slide on the front side of the blocks constituting the mold, mechanism for moving one pair of slides toward the center of the mold simultaneously and back again, mechanism for subsequently moving the other pair of opposite slides simultaneously toward the center of the mold and back again, flaps pivoted to the inner sides of said folding-slides, levers and links connecting the rear ends of the flaps to the framing, means for pushing the box into the mold until the upper edge of the cardboard body of the box is in a plane with the inner faces of the said flaps and means for removing the blank from the mold and the die.

16. In combination with a rectangular mold a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip projecting beyond the top and the bottom of the partially-formed box to a side thereof, means for holding it temporarily thereto, means for imparting one whole revolution to the die and the box, means for removing the temporary holding device for the covering-strip from the box, means for cutting the covering-strip, folding-slides adapted to slide on the front side of the blocks constituting the mold, mechanism for moving one pair of slides toward the center of the mold simultaneously and back again, mechanism for subsequently moving the other pair of opposite slides simultaneously toward the center of the mold and back again, folding-levers pivoted to the inner sides of the said folding-slides, levers and links connecting the rear ends of the folding-levers to the framing, means for in the first instance moving the die with the box toward the mold until the bottom of the box is in a plane with the outer face of the folding-slides in position for the bottom edge of the covering-strip to be folded down thereby, means for then pushing the box with the die into the mold until the upper edge of the cardboard body of the box is in a plane with the inner faces of the said folding-slides in position for the top edge of the covering-strip to be folded down by the said folding-levers, and means for removing the box from the mold and the die.

17. In combination with a rectangular mold a corresponding die, means for pushing such die into the mold together with a cross-shaped blank for bending up the wings of the latter, means for holding the box thus partially formed fast on the die, means for drawing the die together with such box out of the mold, means for applying an adhesive covering-strip projecting beyond the top edge of the partially-formed box to a side thereof, means for holding it temporarily thereto, means for imparting one whole revolution to the die together with the box, means for removing the temporary holding device for the covering-strip from the box, means for cutting the covering-strip, means for pushing the die together with the box into the mold, means for folding the edges of the covering-strip projecting beyond the top edge of the box down on the inside of the sides of the box, means for drawing back the die from the box and the mold, a frame carrying a second die normally not in front of the mold, means for moving the said frame until such second die is in front of the mold, means for pushing the second die into the mold and the box contained therein, means for drawing the second die together with the box out of the die and means for removing the box from the second die.

18. In combination with a rectangular mold a corresponding die, means for pushing such die into the mold together with a cross-shaped blank for bending up the wings of the latter, means for holding the box thus partially formed fast on the die, means for drawing the die together with the box out of the mold, means for applying an adhesive covering-strip projecting beyond the top edge of the partially-formed box to a side thereof, means for holding it temporarily thereto, means for imparting one whole revolution to the die together with the box, means for removing the temporary holding device for the covering-strip from the box, means for cutting the covering-strip, means for pushing the die together with the box into the mold, means for folding the edges of the covering-strip projecting beyond the top edge of the box down on the inside of the sides of the box, means for drawing back the die from the box and the mold, a frame pivoted to the frame of the machine and carrying a second die and spindle, means for moving the said frame to bring the second die in front of the mold, means for sliding the second die into the box in the mold and for withdrawing the said die and box therefrom, and means for removing the box from the second die, substantially as described.

19. In combination with the rectangular mold and the die adapted to push a cross-shaped blank into the mold for bending up the lateral wings thereof an automatic apparatus for feeding the ready-cut blanks to the mold and die comprising guides for the said blanks, a block sliding on one of the said guides, a pawl pivoted on the said block, a rod also pivoted on the said pawl, and means for reciprocating the said rod to feed the blanks forward, substantially as described.

20. In combination with the rectangular mold and the die adapted to push a cross-shaped blank into the mold for bending up the lateral wings thereof an automatic apparatus for feeding the ready-cut blanks to the mold and die, comprising a guide for the blank, a rod carrying a pushing-pawl engaging with the blank, a block sliding on the said guide, a pawl pivoted on the said block, a rod also pivoted to the said pawl, and means for reciprocating the two rods simultaneously in opposite directions, substantially as described.

21. In combination with the rectangular mold and the die adapted to push a cross-shaped blank into the mold for bending up the lateral wings thereof an automatic apparatus for cutting the blanks from an endless strip of pasteboard and for feeding them to the mold and die, comprising a guide, a reciprocating frame carrying a pawl engaging with the pasteboard strip moving along the guide, counter-pawls carried by the guide, means for moving such frame, movable punches, fixed counter-punches, means for moving the movable punches toward the fixed punches and away from them, feeding-pawls, rods connected with the said pawls, and means for reciprocating the said rods to cause the pawls to engage consecutively with the ready-cut blanks, substantially as described.

22. In combination with the rectangular mold and the die adapted to push a cross-shaped blank into the mold for bending up the lateral wings thereof an automatic apparatus for cutting the blanks from an endless strip of pasteboard and for feeding them to the mold and die, comprising a pair of movable punches opposite to both edges of the strip each punch having a height equal to the height of the box and a length equal to double this height the centers of these punches being connected by a cutter, corresponding fixed counter-punches, means for moving the movable punches toward the fixed punches and away from them, guides for the endless pasteboard strip, a reciprocating frame, a pawl carried by the said frame and engaging with such strip, means for reciprocating the said frame along the guides, feeding-pawls, rods connected with the said feeding-pawls, and means for reciprocating the said rods to cause the pawls to engage consecutively with the ready-cut blanks, substantially as described.

23. In a machine of the character described, the combination with a mold; of a corresponding die, a hollow spindle upon which the said die is mounted, a ring having radial arms mounted to slide upon the said spindle, spring-actuated rods carrying gripping-pins arranged to slide in the said arms, a beveled ring on the said spindle, a second hollow spindle arranged to slide within the first hollow spindle, and connected to the said sliding ring, and means for moving the die into and out of the mold and for sliding the second hollow spindle within the first to slide the said ring along the spindle and cause the rods therein to ride over the beveled ring, substantially as and for the purposes described.

24. In a machine of the character described, the combination with a mold; of a corresponding die, a hollow spindle upon which the said die is mounted, a ring having radial arms mounted to slide upon the said spindle, spring-actuated rods carrying gripping-pins arranged to slide in the said arms, a beveled ring on the said spindle in the path of the said arms, a second hollow spindle within the first spindle and connected with the said sliding ring, a rod within the inner spindle having a plate flush with the face of the die, means for sliding the outer spindle to move the die in or out of the mold, means for sliding the inner hollow spindle independently of the outer one, means for sliding the said rod independently of the hollow spindles, and means for holding the said rod from sliding with the hollow spindles, substantially as and for the purposes described.

In testimony whereof I affix my signature in presence of two witnesses.

JOHANN BINDER.

Witnesses:
HARRY BELMONT,
MORIZ BERGER.